(12) United States Patent
Maeda et al.

(10) Patent No.: US 10,464,477 B2
(45) Date of Patent: Nov. 5, 2019

(54) VEHICLE DISPLAY DEVICE

(71) Applicant: Yazaki Corporation, Tokyo (JP)

(72) Inventors: Tomohiro Maeda, Shizuoka (JP);
Tomohiro Sugiyama, Shimada (JP);
Daisuke Nagashima, Shimada (JP);
Yuusuke Aono, Shizuoka (JP)

(73) Assignee: YAZAKI CORPORATION,
Minato-ku, Tokyo (JP)

( * ) Notice: Subject to any disclaimer, the term of this patent is extended or adjusted under 35 U.S.C. 154(b) by 0 days.

(21) Appl. No.: 16/114,366

(22) Filed: Aug. 28, 2018

(65) Prior Publication Data

US 2019/0071008 A1 Mar. 7, 2019

(30) Foreign Application Priority Data

Sep. 1, 2017 (JP) ................. 2017-168859

(51) Int. Cl.
*B60Q 1/00* (2006.01)
*B60Q 3/14* (2017.01)
*B60K 37/02* (2006.01)
*G09G 3/34* (2006.01)

(52) U.S. Cl.
CPC ............... *B60Q 3/14* (2017.02); *B60K 37/02* (2013.01); *B60K 2370/1531* (2019.05); *B60K 2370/20* (2019.05); *B60K 2370/31* (2019.05); *B60K 2370/347* (2019.05); *G09G 3/342* (2013.01)

(58) Field of Classification Search
None
See application file for complete search history.

(56) References Cited

U.S. PATENT DOCUMENTS

| | | | |
|---|---|---|---|
| 7,755,601 B2 | 7/2010 | Yokota et al. | |
| 10,040,354 B2 * | 8/2018 | Fujita | ............... G01D 7/02 |
| 10,133,069 B2 | 11/2018 | Sato et al. | |
| 2006/0092098 A1 | 5/2006 | Yokota et al. | |
| 2013/0127612 A1 | 5/2013 | Stadler et al. | |
| 2015/0379773 A1 | 12/2015 | Konishi et al. | |
| 2017/0144544 A1 * | 5/2017 | Fujita | ............... G01D 7/02 |
| 2017/0153453 A1 | 6/2017 | Sato et al. | |

FOREIGN PATENT DOCUMENTS

| | | |
|---|---|---|
| DE | 10 2005 052 004 A1 | 5/2006 |
| DE | 10 2011 119 230 B4 | 7/2013 |
| JP | 2016-011863 A | 1/2016 |
| JP | 2016-061727 A | 4/2016 |
| WO | WO-2016009598 A1 * | 1/2016 ............... G01D 7/02 |

OTHER PUBLICATIONS

Communication dated Mar. 27, 2019, issued by the German Patent Office in counterpart German Application No. 102018214266.1.

* cited by examiner

*Primary Examiner* — Vip Patel
(74) *Attorney, Agent, or Firm* — Sughrue Mion, PLLC

(57) ABSTRACT

A vehicle display device includes: a housing unit having an opening facing an eye point side of a vehicle; a decorative member disposed inside the housing unit; a display device configured to display an image inside the housing unit, a drive device configured to move the decorative member in a width direction of the housing unit; and an illumination device operated depending on a movement of the decorative member to irradiate the decorative member with light. The illumination device may have a plurality of light sources arranged along the width direction.

6 Claims, 15 Drawing Sheets

VEHICLE DISPLAY DEVICE

CROSS-REFERENCE TO RELATED APPLICATION(S)

The present application claims priority to and incorporates by reference the entire contents of Japanese Patent Application No. 2017-168859 filed in Japan on Sep. 1, 2017.

BACKGROUND OF THE INVENTION

1. Field of the Invention

The present invention relates to a vehicle display device.

2. Description of the Related Art

In the related art, there is known a vehicle display device having a decorative member. In Japanese Patent Application Laid-open No. 2016-11863, a technology of a vehicle display device having a decorative member, a light source that irradiates the decorative member with light, and a virtual image generation unit that displays a virtual image between a vehicle driver and a decorative member is discussed.

There is a room for further improvement in a design property of the vehicle display device. For example, the design property can be improved by appropriately irradiating a movable decorative member with light.

SUMMARY OF THE INVENTION

It is an object of the invention to provide a vehicle display device capable of improving a design property.

In order to achieve the above mentioned object, a vehicle display device according to one aspect of the present invention includes a housing unit that has an opening facing an eye point side of a vehicle; a decorative member disposed inside the housing unit; a display device that displays an image inside the housing unit; a drive device that moves the decorative member in a width direction of the housing unit; and an illumination device operated depending on a movement of the decorative member to irradiate the decorative member with light.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A vehicle display device according to an embodiment of the invention will now be described with reference to the accompanying drawings. Note that the invention is not limited to such embodiments. The elements described in the following embodiment include those easily anticipated by a person ordinarily skilled in the art or substantially the same ones.

Embodiment

Figure 1:
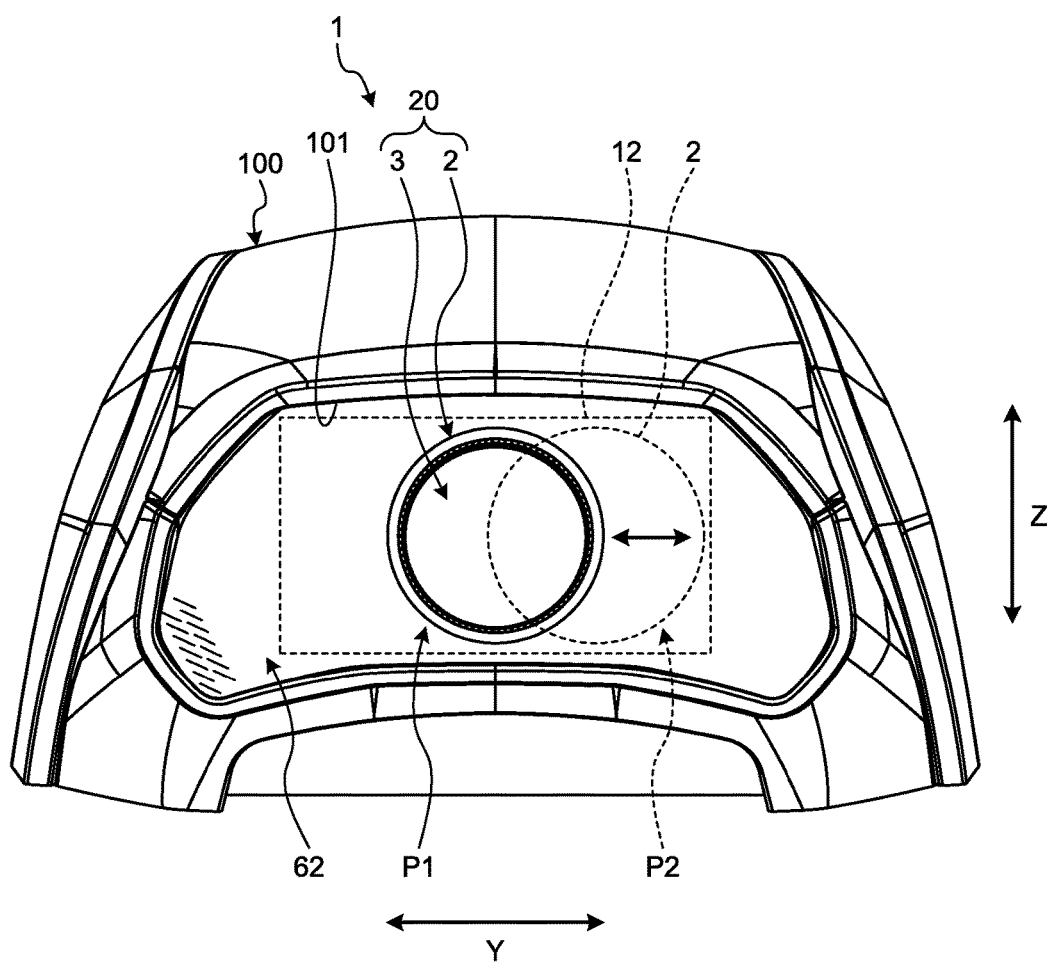
FIG. 1 is a front view illustrating a vehicle display device according to an embodiment.
Figure 2:
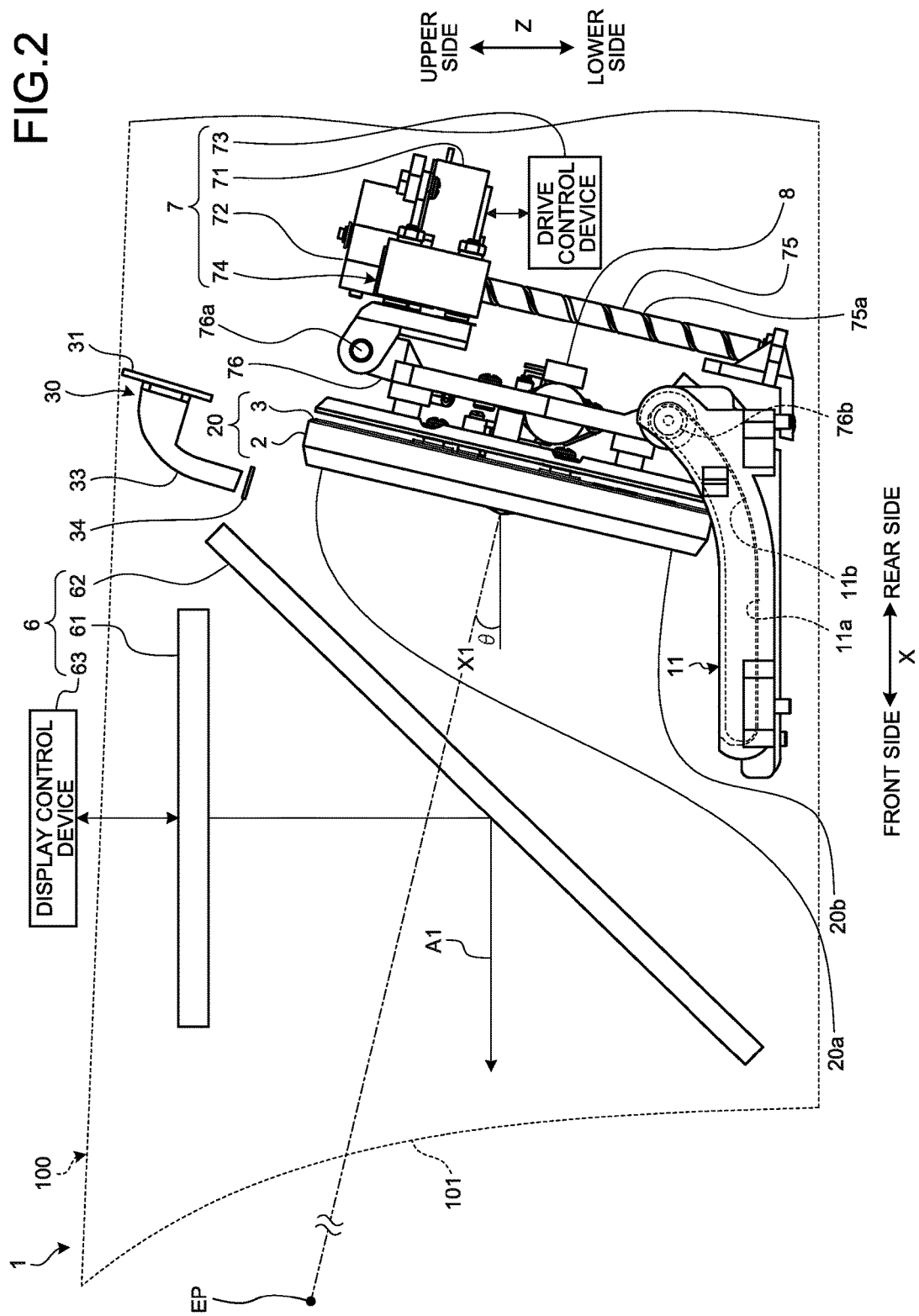
FIG. 2 is a side view illustrating an internal configuration of the vehicle display device according to the embodiment.
Figure 3:
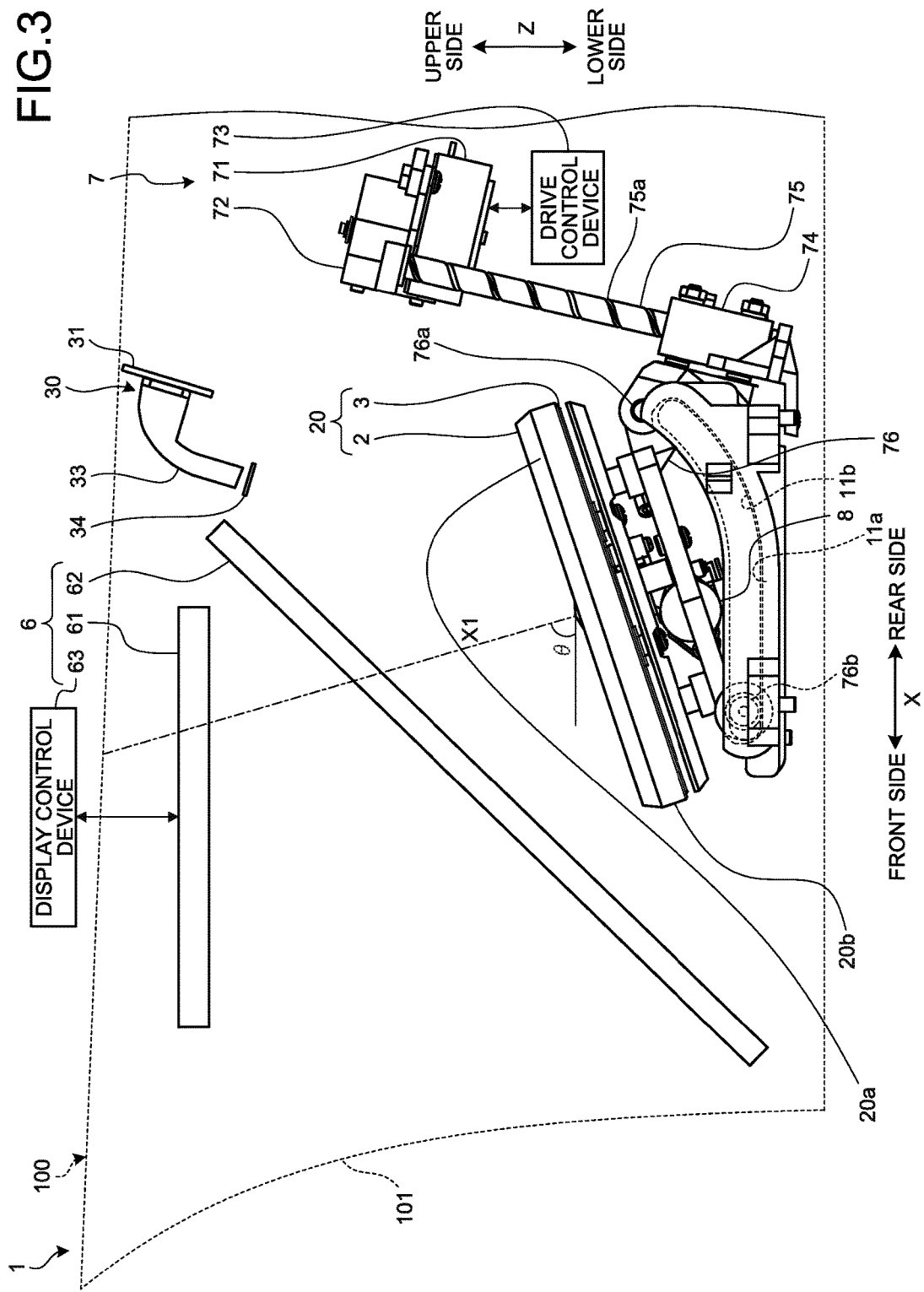
FIG. 3 is another side view illustrating the internal configuration of the vehicle display device according to the embodiment.
Figure 4:
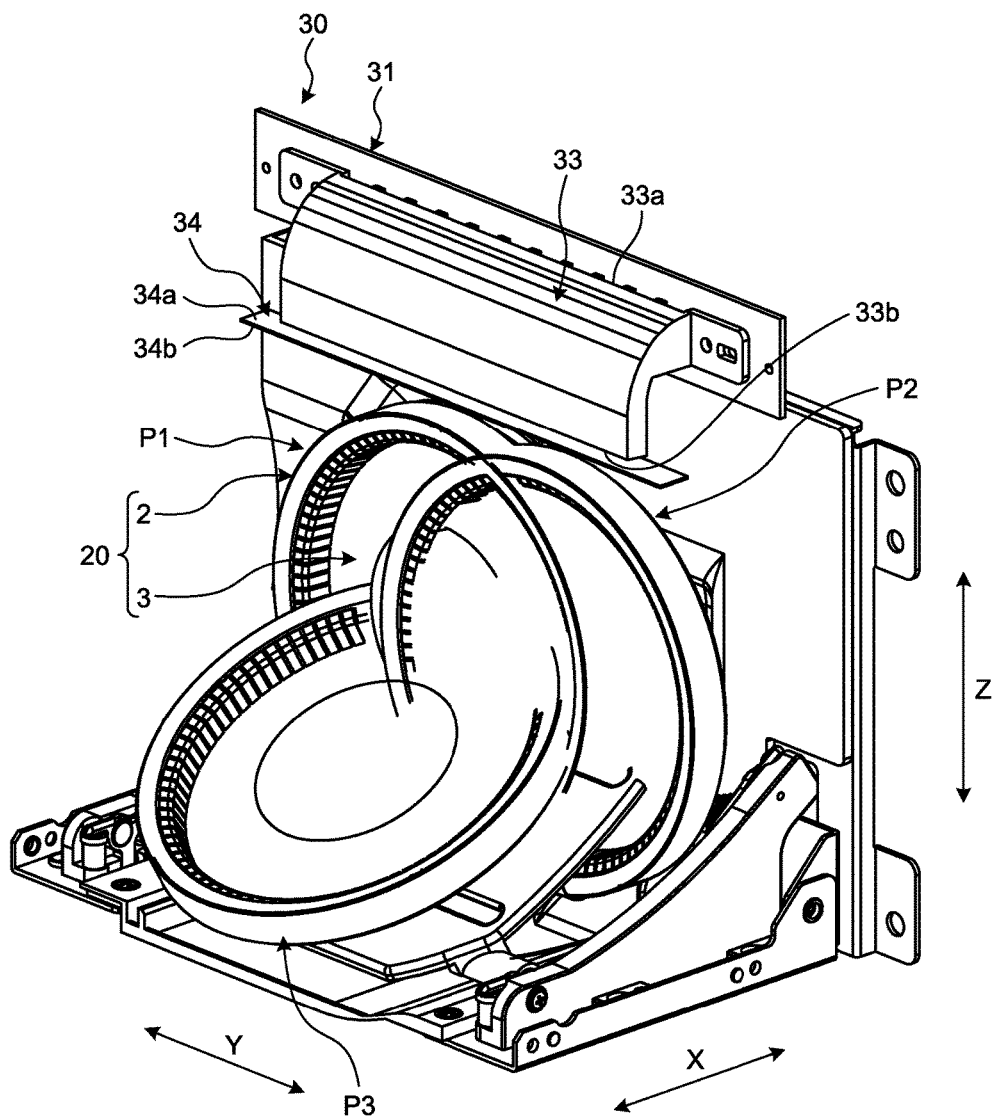
FIG. 4 is a perspective view illustrating an internal configuration of the vehicle display device according to the embodiment.
Figure 5:
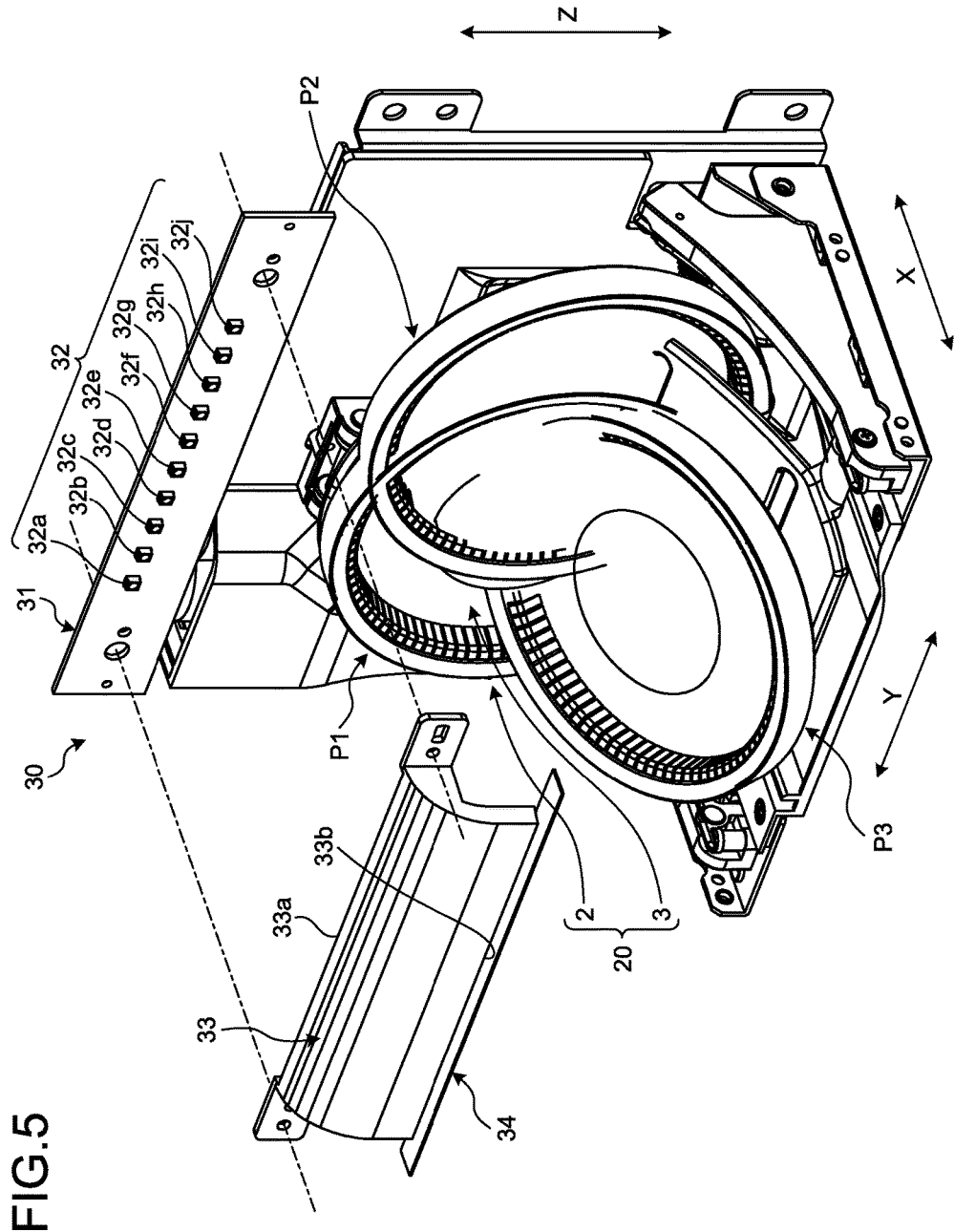
FIG. 5 is an exploded perspective view illustrating an illumination device according to the embodiment.
Figure 6:
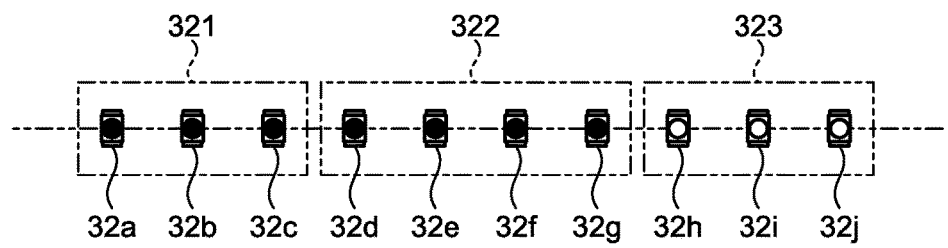
FIG. 6 is a front view illustrating a turn-on state of a light source group according to the embodiment.
Figure 6:
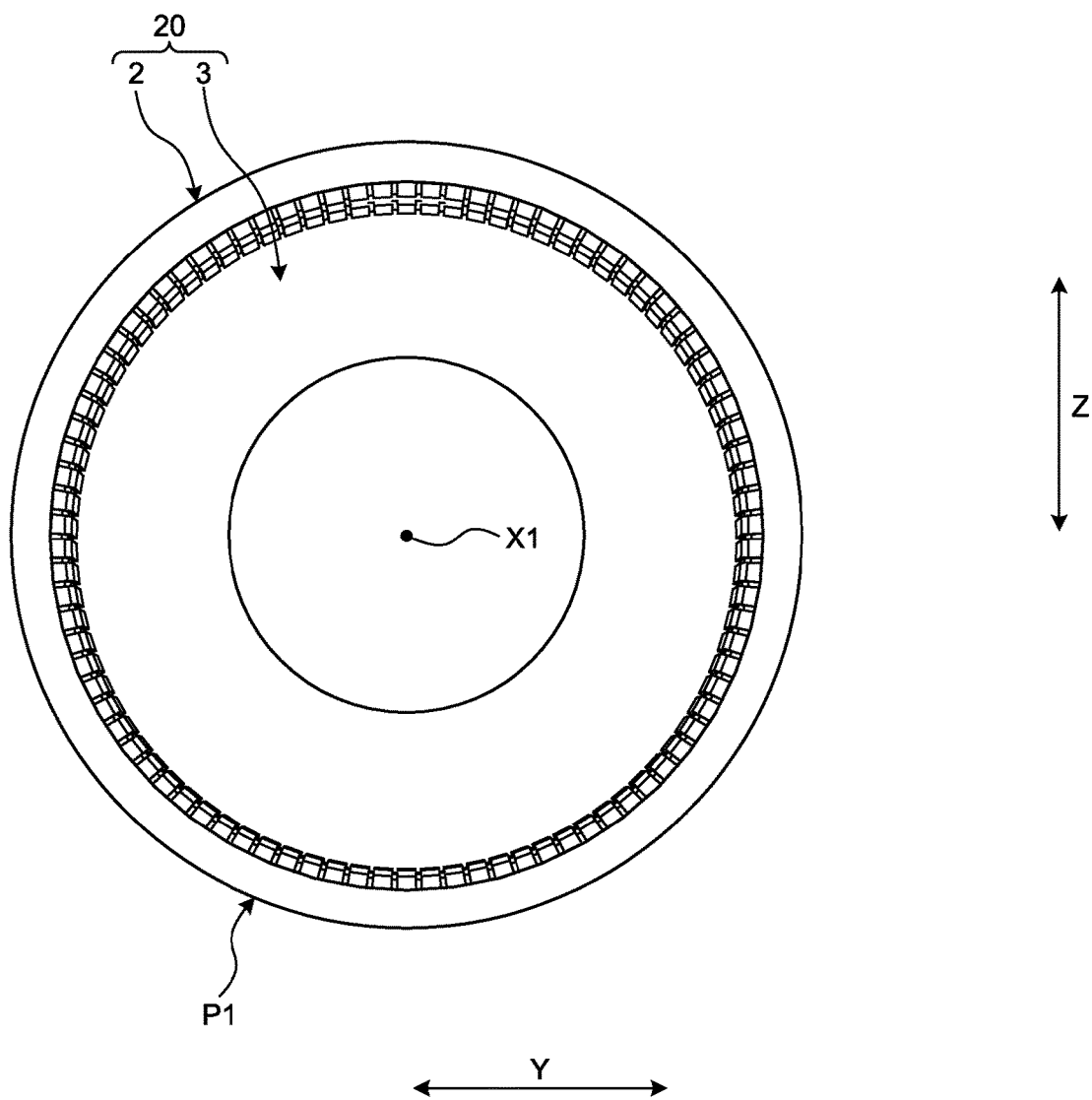
Figure 7:
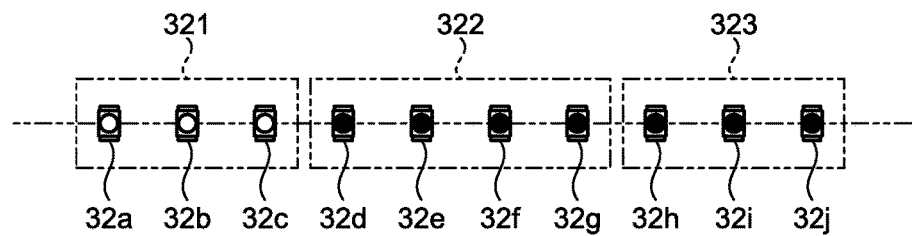
FIG. 7 is another diagram a turn-on state of a light source group according to the embodiment.
Figure 7:
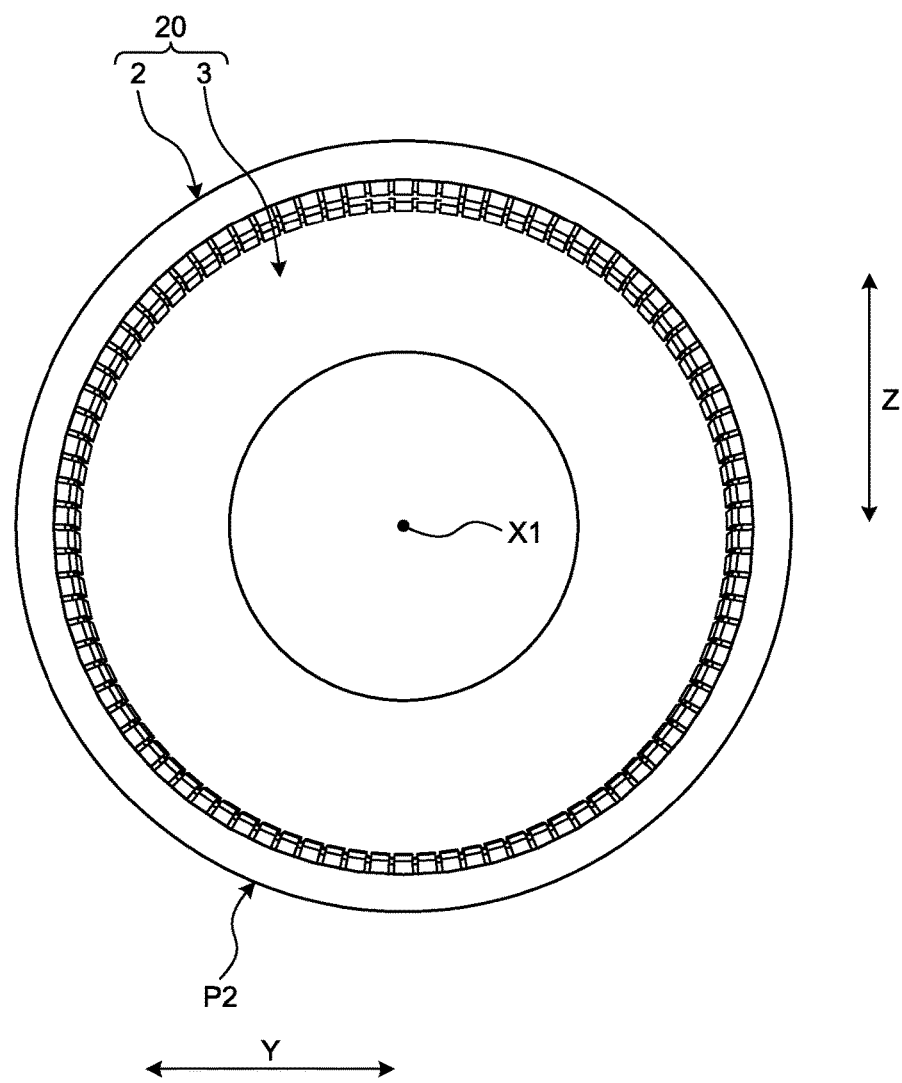
Figure 8:
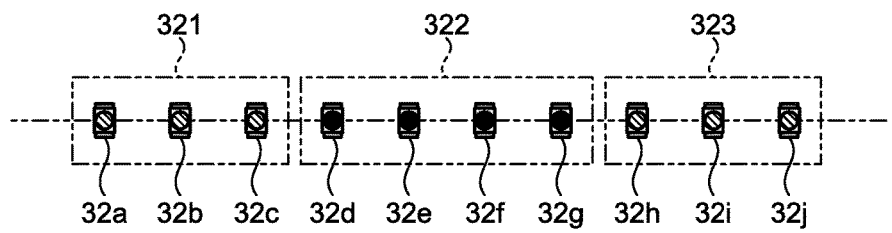
FIG. 8 is a diagram illustrating a light-down control and a light-up control according to the embodiment.
Figure 8:
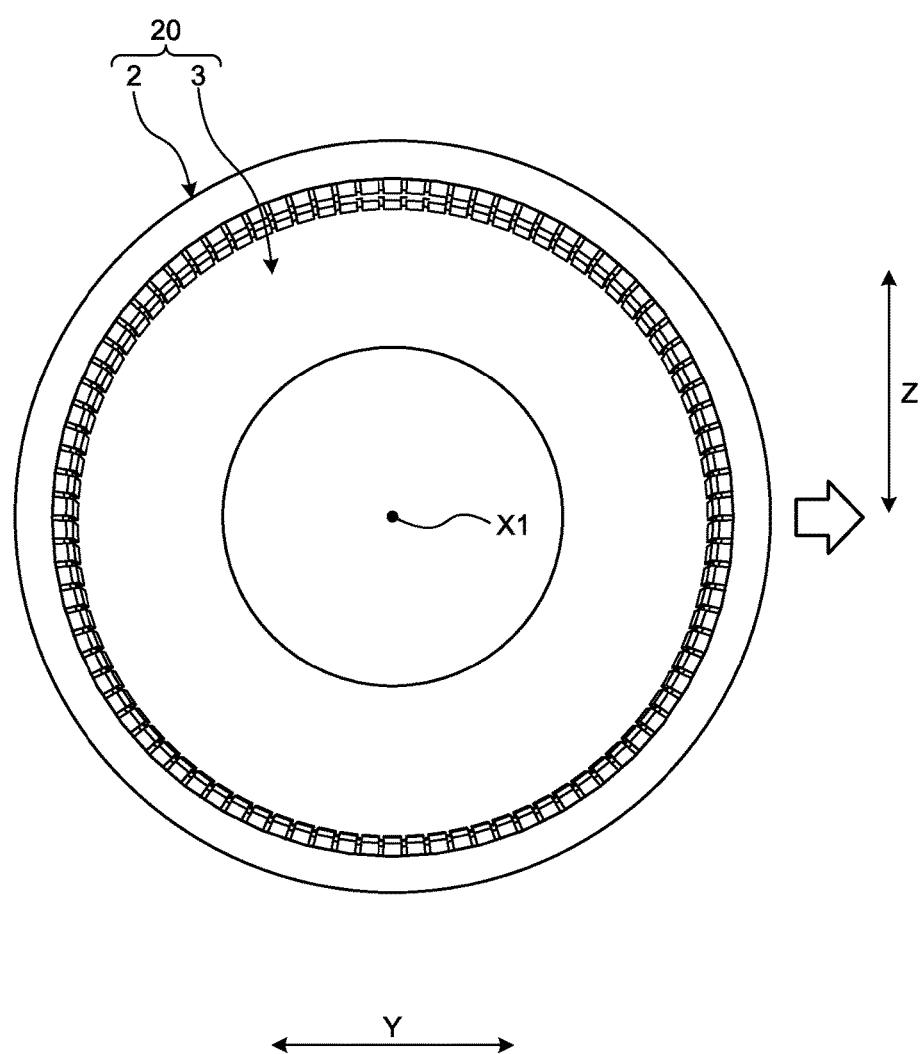

An embodiment will now be described with reference to FIGS. 1 to 14. The embodiment relates to a vehicle display device. FIG. 1 is a front view illustrating the vehicle display device according to an embodiment. FIG. 2 is a side view illustrating an internal configuration of the vehicle display device according to the embodiment. FIG. 3 is another side view illustrating an internal configuration of the vehicle display device according to the embodiment. FIG. 4 is a perspective view illustrating an internal configuration of the vehicle display device according to the embodiment. FIG. 5 is an exploded perspective view illustrating an illumination device according to the embodiment. FIG. 6 is a front view illustrating a turn-on state of a light source group according to the embodiment. FIG. 7 is another diagram illustrating a turn-on state of the light source group according to the embodiment. FIG. 8 is a diagram illustrating a light-down control and a light-up control according to the embodiment.

The vehicle display device 1 according to this embodiment is mounted on a vehicle such as an automobile. As illustrated in FIGS. 1 to 3, the vehicle display device 1 according to this embodiment includes a housing unit 100, a decorative member 2, a virtual image display device 6, a drive device 7, a second drive device 8, and an illumination device 30. The housing unit 100 is a cylindrical member having a closed end in one side of the axial direction. The housing unit 100 is a light-blocking member formed of metal, synthetic resin, or the like. The housing unit 100 is placed in front of a vehicle driver's seat in a vehicle front-rear direction. The housing unit 100 is disposed, for example, in an opening of an instrument panel. The housing unit 100 is, for example, a trapezoidal member as seen in a front view.

The housing unit 100 has an opening 101 facing the driver's seat. In the description of the vehicle display device 1, a "depth direction X" refers to an axial direction of the housing unit 100. The depth direction X is typically a vehicle front-rear direction. In the depth direction X, a "front side" refers to a driver's seat side and is typically a vehicle rear side. In the depth direction X, the "rear side" is opposite to the driver's seat side and is typically a vehicle front side. The opening 101 is provided in the front face of the housing unit 100. In addition, a "height direction Z" refers to a height direction when the housing unit 100 is placed on the vehicle and is typically a vehicle vertical direction. A "width direction Y" refers to a direction perpendicular to the depth direction X and the height direction Z and is typically a vehicle width direction. In the width direction Y, the "left side" refers to a left side as seen from the driver's seat and is typically a vehicle left side. In the width direction Y, the "right side" refers to a right side as seen from the driver's seat and is typically a vehicle right side.

The opening 101 has a horizontally long shape in which a length of the width direction Y is longer than a length of the height direction Z. The decorative member 2 is disposed inside the housing unit 100. The decorative member 2 is a member formed in a ring shape. The decorative member 2 according to this embodiment is formed in a circular cylindrical shape. The decorative member 2 is formed of, for example, synthetic resin or metal such as aluminum. The surface of the decorative member 2 has, for example, a light color such as silver or white. In a case where the decorative member 2 is formed of synthetic resin, plating of a light color such as silver or white may be applied to a surface of the decorative member 2. Glossy plating may be employed. Mirror finishing or mat finishing may also be applied to the surface of the decorative member 2.

An information panel 3 is arranged in rear of the decorative member 2. The information panel 3 closes the inner side of the decorative member 2 from the rear side. The information panel 3 is a circular plate member, for example, molded of synthetic resin. The information panel 3 has, for example, a deep color such as black. Mat finishing may also be applied to the surface of the information panel 3.

As illustrated in FIG. 3, the virtual image display device 6 has a display device 61, a half mirror 62, and a display control device 63. The half mirror 62 is a semi-translucent member. The half mirror 62 reflects a part of the incident light and transmits the other part of the incident light. The half mirror 62 has a main body formed of transparent resin or glass and a half mirror layer. The half mirror layer is a metal or inorganic multilayer film formed through lamination on the surface of the main body or the like. The half mirror 62 is arranged between the opening 101 and the decorative member 2 in the depth direction X. The half mirror 62 is tilted toward the rear side of the depth direction X as it extends upward in the height direction Z. The half mirror 62 is held by the housing unit 100 in the tilted posture described above.

The display device 61 projects an image toward the half mirror 62. The display device 61 is controlled by the display control device 63. The display device 61 is, for example, a liquid crystal display device such as a thin-film transistor liquid crystal display (TFT-LCD). The display device 61 is placed over the half mirror 62 in the height direction Z. In addition, the display device 61 faces the half mirror 62 in the height direction Z.

An image projected from the display device 61 is reflected by the half mirror 62 to the front side of the depth direction X as indicated by the arrow A1. The image reflected by the half mirror 62 is visually recognized as a virtual image focused on a position in rear of the half mirror 62 as seen from the eye point EP. The eye point EP is a position predetermined as a driver view position. The virtual image is focused, for example, in front of the decorative member 2, slightly in front of the decorative member 2, or in rear of the decorative member 2.

The virtual image display device 6 according to this embodiment displays a virtual image on an image display area 12 of FIG. 1. The image display area 12 is an area that can be viewed through the opening 101 from the eye point EP inside the housing unit 100. The image display area 12 extends from the left end of the opening 101 to the right end in the width direction Y. In addition, the image display area 12 extends from the upper end of the opening 101 to the lower end in the height direction Z. The image display area 12 has, for example, a rectangular shape.

In the vehicle display device 1 according to this embodiment, the decorative member 2 and the information panel 3 are movable. In the following description, the decorative member 2 and the information panel 3 will be collectively referred to as a "movable member 20". The vehicle display device 1 has a drive device 7 and a second drive device 8 for moving the movable member 20. The movable member 20 can be placed in an upright position of FIG. 2 and a tilted position of FIG. 3. The movable member 20 may also stop between the upright position and the tilted position.

The upright position is a position where the movable member 20 faces the eye point EP. In a case where the movable member 20 is placed in the upright position, the eye point EP is placed on a center axial line X1 of the decorative member 2 as seen in a side view as illustrated in FIG. 2. In a case where the movable member 20 has the upright position, a tilt angle θ of the center axial line X1 of the movable member 20 with respect to the depth direction X is minimized. The movable member 20 having the upright position is tilted such that its upper end 20a is placed slightly in rear of a lower end 20b. Note that the tilt angle θ is also a tilt angle of the decorative member 2 with respect to the vehicle vertical direction. That is, if the tilt angle θ is set to 0, the decorative member 2 has an upright posture. As the tilt angle θ increases, the decorative member 2 is further tilted with respect to the vehicle vertical direction. The posture of the decorative member 2 having the upright position is an upright posture having a little tilt angle of the decorative member 2 with respect to the vehicle vertical direction.

The tilt position of FIG. 3 is a position in which the movable member 20 faces the display device 61. In a case where the movable member 20 has a tilted position, the tilt angle θ of the center axial line X1 of the movable member 20 with respect to the depth direction X is maximized. Note that the tilt angle θ of the center axial line X1 with respect to the depth direction X is also a tilt angle of the decorative member 2 with respect to the vehicle vertical direction. That is, in a case where the movable member 20 has a tilted position, the tilt angle of the decorative member 2 with respect to the vehicle vertical direction is maximized within a movable range of the decorative member 2. A posture of the decorative member 2 having the tilted position is a tilted posture in which a tilt angle of the decorative member 2 is larger than that of the upright posture with respect to the vehicle vertical direction.

The drive device 7 has a power source 71, a power transmission mechanism 72, a drive control device 73, and a conversion member 74. The drive device 7 is disposed in rear of the movable member 20. The power source 71 is, for example, a rotary motor. The power transmission mechanism 72 rotates a shaft member 75 by virtue of a rotating force output from the power source 71. The conversion member 74 reciprocates along an axial direction of the shaft member 75 by virtue of the rotation of the shaft member 75. The shaft member 75 is a circular cylindrical member extending along the height direction Z. The shaft member 75 is tilted such that its upper end is placed slightly in rear of the lower end. The tilt angle of the shaft member 75 corresponds to the tilt angle of the movable member 20 having an upright position.

A spiral trench portion 75a is formed on an outer circumferential surface of the shaft member 75. The conversion member 74 has a nut-like rotatable member engaged with the trench portion 75a. This rotatable member converts a rotational motion of the shaft member 75 into a rectilinear motion along the axial direction of the shaft member 75. The conversion member 74 moves along the shaft member 75 in the height direction Z as the shaft member 75 rotates around the axis of the shaft member 75.

The conversion member 74 is connected to the movable member 20 through a holding member 76. The holding member 76 is connected to the rear side of the movable member 20 and moves in the height direction Z along with the movable member 20. The conversion member 74 and the upper end of the holding member 76 are connected to each other through a rotational shaft 76a. The center axis direction of the rotational shaft 76a is the width direction Y. The holding member 76 is rotatable with respect to the center of the rotational shaft 76a.

A guided portion 76b is provided in the lower end of the holding member 76. The guided portion 76b is provided in both sides of the width direction Y of the holding member 76. The guided portion 76b according to this embodiment is a rotatable body such as a vehicle wheel supported rotatably. A guide member 11 for guiding the guided portion 76b is arranged inside the housing unit 100. The guide member 11 has a guide rail 11a. The guided portion 76b is inserted into the guide rail 11a and is rolled along the guide rail 11a. The guide rail 11a extends along the depth direction X as a whole. An arc-shaped portion 11b is provided in the rear end of the guide rail 11a. The arc-shaped portion 11b is curved upward in the height direction Z as it extends to the rear side of the depth direction X.

The drive control device 73 controls a magnitude of the rotational force output from the power source 71 and a rotational direction. In a case where the movable member 20 is in the upright position as illustrated in FIG. 2, the guided portion 76b is positioned in the rear end of the guide rail 11a. In this case, the conversion member 74 is positioned in the upper end of the shaft member 75. In a case where the movable member 20 moves from the upright position to the tilted position, the drive control device 73 controls the power source 71 such that the conversion member 74 moves downward. More specifically, the drive control device 73 rotates the shaft member 75 using the power source 71 such that the conversion member 74 moves downward.

As the conversion member 74 moves downward along the shaft member 75, the guided portion 76b is guided to the guide rail 11a and moves to the front side. As the conversion member 74 moves downward, the lower end 20b of the movable member 20 relatively moves to recede from the shaft member 75 toward the front side. As a result, the tilt angle of the movable member 20 in the height direction Z increases. The drive control device 73 stops the output of the power source 71 as the movable member 20 reaches the tilted position. The tilted position is the lowermost position within the movable range of the decorative member 2 in the vehicle vertical direction.

In a case where the movable member 20 moves from the tilted position to the upright position, the drive control device 73 controls the power source 71 such that the conversion member 74 moves upward. More specifically, the drive control device 73 rotates the shaft member 75 using the power source 71 such that the conversion member 74 moves upward. As the conversion member 74 moves upward along the shaft member 75, the guided portion 76b is guided to the guide rail 11a and moves rearward. As the conversion member 74 moves upward, the lower end 20b of the movable member 20 relatively moves rearward to approach the shaft member 75. As a result, the tilt angle of the movable member 20 in the height direction Z decreases. The drive control device 73 stops the output of the power source 71 as the movable member 20 reaches the upright position.

The vehicle display device 1 according to this embodiment further has a second drive device 8 for moving the movable member 20 in the width direction Y. The second drive device 8 is disposed in the holding member 76. The second drive device 8 has, for example, a second power source such as a motor and a second power transmission mechanism. The second power transmission mechanism converts a rotational motion caused by the output power of the second power source into a rectilinear motion of the width direction Y. The second drive device 8 is interposed between the holding member 76 and the movable member 20. The second drive device 8 relatively moves the movable member 20 with respect to the holding member 76 in the width direction Y. According to this embodiment, the operation of the second drive device 8 is controlled by the drive control device 73. That is, the drive control device 73 controls the output power of the second power source and the rotational direction.

The second drive device 8 places the movable member 20 in a first position P1 and a second position P2 of FIG. 1. The first position P1 is a center position of the width direction Y on the image display area 12 inside the housing unit 100. The first position P1 is also an upright position of the movable member 20. The second position P2 is a position closer to the end of the width direction Y relative to the first position P1 on the image display area 12. The second position P2 according to this embodiment is closer to the right side relative to the first position P1. In FIG. 1, the decorative member 2 placed in the second position P2 is indicated by a dotted line.

As illustrated in FIG. 2, the illumination device 30 is disposed in the upper side of the height direction Z in the internal space of the housing unit 100. The illumination device 30 is disposed in the upper side of the height direction Z relative to the movable member 20. The illumination device 30 irradiates the element of the movable member 20 downward with light. For example, the illumination device 30 irradiates the decorative member 2 with light so that the decorative member 2 can be visually recognized from the eye point EP. The illumination device 30 may irradiate the decorative member 2 directly or indirectly with light. The illumination device 30 of the this embodiment is controlled by the display control device 63. In addition, in the vehicle display device 1 according to this embodiment, the display control device 63 is communicably connected to the drive control device 73. The drive control device 73 controls the posture and position of the movable member 20 in response to a command of the display control device 63.

FIG. 4 is a perspective view illustrating an internal configuration of the vehicle display device 1. FIG. 5 is an exploded perspective view illustrating the illumination device 30. Note that FIGS. 4 and 5 illustrate a movable member 20 placed in the second position P2 and the tilted position P3 for reference in addition to the movable member 20 placed in the first position P1. As illustrated in FIGS. 4 and 5, the illumination device 30 has a substrate 31, a plurality of light sources 32 (32a, 32b, 32c, 32d, 32e, 32f, 32g, 32h, 32i, and 32j), a prism 33, and a diffuser 34. The substrate 31 is disposed over the movable member 20 and is held by the housing unit 100. The substrate 31 according to this embodiment has a rectangular shape having a width direction Y corresponding to a long side direction and a height direction Z corresponding to a short side direction.

The light source 32 includes a light-emitting element such as a light-emitting diode (LED). The light source 32 is fixed to the substrate 31 and is electrically connected to a control circuit of the substrate 31. A plurality of light sources 32 (32a, 32b, 32c, 32d, 32e, 32f, 32g, 32h, 32i, and 32j) are arranged at equal intervals along the width direction Y in this order. The light source 32a is a light source 32 arranged in the leftmost side as seen from the eye point EP, and the light source 32j is a light source 32 arranged in the rightmost side as seen from the eye point EP. The optical axis direction of the light source 32 is set to the depth direction X. The light source 32 is arranged to face the front side. The control circuit of the substrate 31 controls the turn-on or turn-off operation and the amount of emitted light of each light source 32.

The prism 33 guides light emitted from the light source 32 to the movable member 20. The prism 33 is a light guide member formed of acrylic resin or the like to provide transparency. The prism 33 has a light incidence surface 33a facing the light source 32 and a light emission surface 33b facing the movable member 20. The light incidence surface 33a is a surface facing the light sources 32a to 32j and is, for example, planar. The light from each light source 32 (32a to 32j) is incident from the light incidence surface 33a to the prism 33.

The light emission surface 33b is a downward surface which is, for example, planar. As illustrated in FIG. 2, the light emission surface 33b is placed slightly in front of the upper end 20a of the movable member 20. The prism 33 is fixed to the substrate 31. The light incident from the light incidence surface 33a is reflected inside the prism 33, is guided to the light emission surface 33b, and is then emitted from the light emission surface 33b to the movable member 20 side.

The diffuser 34 is a member that diffuses light. The diffuser 34 according to this embodiment is a rectangular plate-shaped member. The diffuser 34 has a light incidence surface 34a and a light emission surface 34b. The light incidence surface 34a faces the light emission surface 33b of the prism 33. The light emission surface 34b is a surface facing downward. The light incident from the light incidence surface 34a is diffused inside the diffuser 34 and is emitted from the light emission surface 34b to the movable member 20 side.

As illustrated in FIG. 6, the light source 32 according to this embodiment is divided into three light source groups 321, 322, and 323. The first light source group 321 is a light source group placed in the leftmost side as seen from the eye point EP side. The first light source group 321 includes light sources 32a, 32b, and 32c. The third light source group 323 is a light source group placed in the rightmost side as seen from the eye point EP side. The third light source group 323 includes light sources 32h, 32i, and 32j. The second light source group 322 is a light source group placed between the first light source group 321 and the third light source group 323. The second light source group 322 includes light sources 32d, 32e, 32f, and 32g.

The display control device 63 changes a light source group to be turned on out of the three light source groups 321, 322, and 323 depending on the position of the movable member 20 in the width direction Y. The position of the movable member 20 is acquired from, for example, the drive device 7. The position of the movable member 20 acquired in this case is, for example, an estimated position of the movable member 20. The display control device 63 may acquire the current position of the movable member 20 from the detection switch disposed in the passage of the movable member 20.

If the decorative member 2 is placed in the first position P1, the display control device 63 turns on the first and second light source groups 321 and 322 as illustrated in FIG. 6. For example, the display control device 63 turns on each of the light sources 32a, 32b, and 32c of the first light source group 321 and each of the light sources 32d, 32e, 32f, and 32g of the second light source group 322 with the same amount of light. The light source 32d is a light source 32 placed in the center of the light sources 32a, 32b, 32c, 32d, 32e, 32f, and 32g that are turned on. The position of the light source 32d of the width direction Y is substantially the same as a position of the center axial line X1 of the movable member 20 placed in the first position P1. Therefore, since the movable member 20 is illuminated by the light from the first and second light source groups 321 and 322, irregularity of brightness in the decorative member 2 is not easily generated.

The display control device 63 turns on the second and third light source groups 322 and 323 as illustrated in FIG. 7 if the decorative member 2 is placed in the second position P2. For example, the display control device 63 turns on each of the light sources 32d, 32e, 32f, and 32g of the second light source group 322 and each of the light sources 32h, 32i, and 32j of the third light source group 323 with the same amount of light. The light source 32g is a light source placed in the center of the light sources 32d, 32e, 32f, 32g, 32h, 32i, and 32j that are turned on. The position of the light source 32g is substantially the same as a position of the center axial line X1 of the movable member 20 placed in the second position P2. Therefore, irregularity of brightness in the decorative member 2 is not easily generated.

The display control device 63 turns off the first light source group 321 and turns on the third light source group 323 if the decorative member 2 moves from the first position P1 to the second position P2. In a case where the decorative member 2 moves from the first position P1 to the second position P2, the first light source group 321 is a light source group placed in the rear side in the movement direction of the decorative member 2. Meanwhile, the third light source group 323 is a light source group placed in the front side in the movement direction of the decorative member 2. That is, the display control device 63 turns on the front light source group (third light source group 323) and turns off the rear light source group (first light source group 321) in the movement direction of the decorative member 2. It is possible to appropriately light up the decorative member 2 by turning on or off the first and third light source groups 321 and 323 depending on a movement of the decorative member 2 in this manner.

The display control device 63 according to this embodiment gradually lights down the light sources 32 of the first light source group 321 and then turns off the light sources 32 if the decorative member 2 moves from the first position P1 to the second position P2. In addition, the display control device 63 turns on the light sources 32 of the third light source group 323 and then gradually lights up the light sources 32. Since the light-down control for the first light source group 321 and the light-up control for the third light source group 323 are performed, an abrupt change in brightness or irregularity of luminance is not easily generated in the decorative member 2.

The light-down control of the first light source group 321 will be described in more details. As the decorative member 2 starts to move from the first position P1 to the second position P2, the display control device 63 executes a light-down control for gradually reducing the amount of emitted light of the light sources 32 of the first light source group 321. The start timing of the light-down control may be simultaneous with the start of the movement of the decorative member 2 or may be delayed by a predetermined period of time from the start of the movement. As the decorative member 2 moves to a predetermined position, the display control device 63 turns off the light sources 32 of the first light source group 321. The timing for turning off the first light source group 321 may be set to when the movable member 20 reaches the second position P2.

The display control device 63 turns on the light sources 32 of the third light source group 323 as the decorative member 2 starts to move from the first position P1 to the second position P2. The turn-on timing of the third light source group 323 may be simultaneous with the start of the movement of the decorative member 2 or may be delayed by a predetermined period of time from the start of the movement. The display control device 63 according to this embodiment turns on the light sources 32 of the third light source group 323 during a period of the light-down control of the first light source group 321. The amount of emitted light of each light source 32 of the third light source group 323 immediately after the turn-on operation is smaller than the amount of emitted light of each light source 32 of the second light source group 322.

The display control device 63 executes the light-up control such that the amount of emitted light of the light sources 32 of the third light source group 323 gradually increases after the turn-on operation. The display control device 63 increases the amount of emitted light of each light source 32 of the third light source group 323 until the amount of emitted light becomes equal to that of each light source 32 of the second light source group 322. The light-up control for the light sources 32 of the third light source group 323 may be terminated, for example, when the movable member 20 reaches the second position P2.

In the display control device 63 according to this embodiment, a light-down control execution period overlaps with the light-up control execution period. That is, as illustrated in FIG. 8, there is a period in which both the first light source group 321 and the third light source group 323 are turned on. In FIG. 8, the amount of emitted light of the light sources 32 of the first light source group 321 gradually decreases, and the amount of emitted light of the light sources 32 of the third light source group 323 gradually increases. Therefore, the amount of emitted light of each light source 32 of the first and third light source groups 321 and 323 is smaller than the amount of emitted light of each light source 32 of the second light source group 322. The position of the decorative member 2 of FIG. 8 is a center position between the first and second positions P1 and P2. In this case, the amount of emitted light of the light sources 32 of the first light source group 321 is equal to the amount of emitted light of the light sources 32 of the second light source group 322. Therefore, irregularity of luminance is not easily generated between the left half and the right half of the decorative member 2.

The amounts of emitted light of the first and third light source groups 321 and 323 in the light-down control and the light-up control are determined such that irregularity of luminance between the left and right sides of the decorative member 2 can be suppressed. Therefore, using the vehicle display device 1 according to this embodiment, it is possible to improve a design property by appropriately lighting up the decorative member 2 during the movement.

In a case where the decorative member 2 moves from the second position P2 to the first position P1, the control is performed inversely to the aforementioned case. That is, the display control device 63 turns off the third light source group 323 and turns on the first light source group 321. In this case, the display control device 63 turns off the light source 32 of the third light source group 323 after executing the light-down control of the third light source group 323. In addition, the display control device 63 executes the light-up control of the light source 32 by turning on the light source 32 of the first light source group 321.

Figure 9:
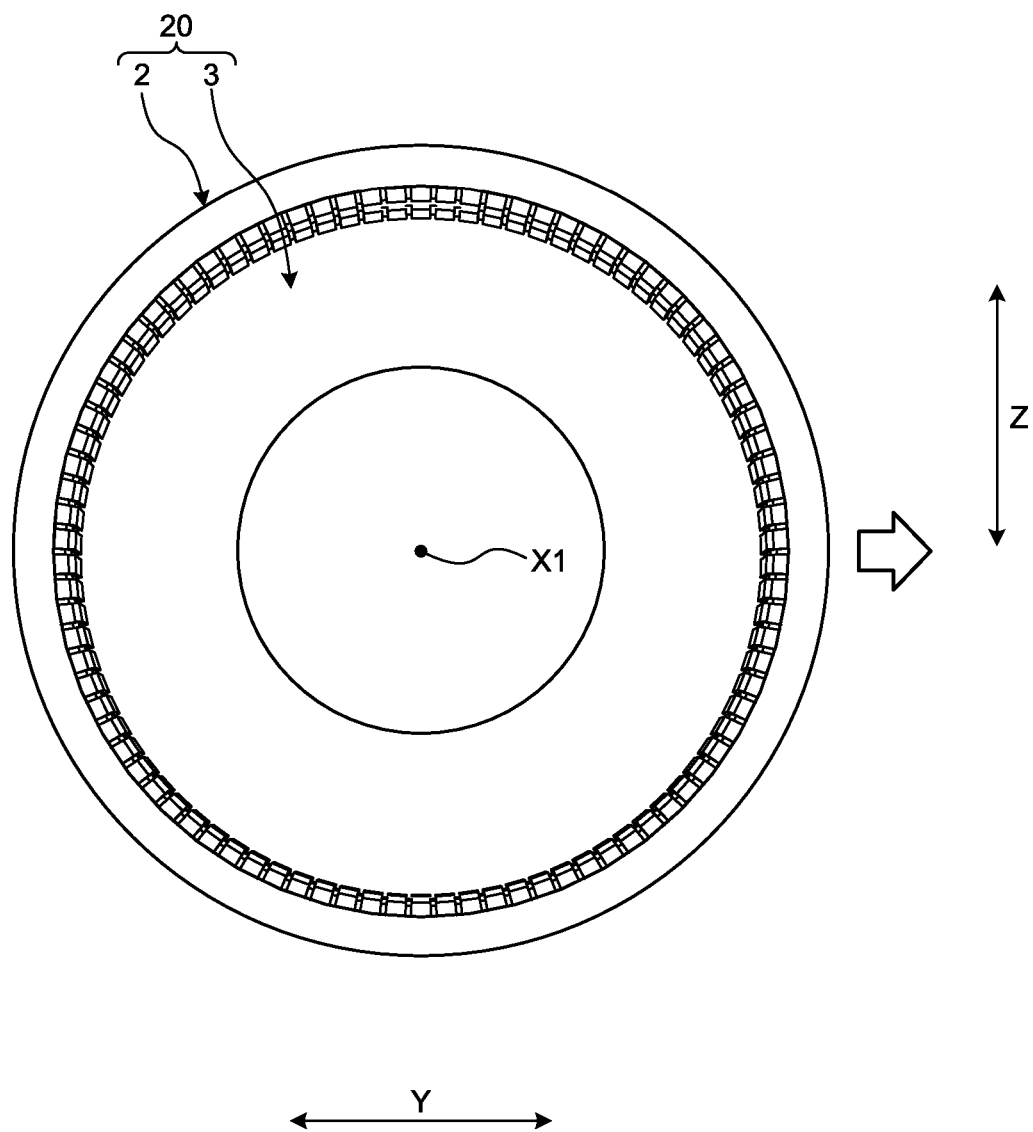
FIG. 9 is a diagram illustrating another light source control according to the embodiment.

Another light source control executed by the display control device 63 will be described. FIG. 9 is a diagram illustrating another light source control according to the embodiment. The control of FIG. 9 is different from the control of FIGS. 6 to 8 in that the light sources 32 are turned on and off one by one depending on a movement of the decorative member 2.

In the position of the movable member 20 of FIG. 9, the center axial line X1 of the movable member 20 is positioned immediately under the light source 32e. In other words, the center axial line X1 of the movable member 20 and the light source 32e are substantially in the same position in the width direction Y. In this case, the display control device 63 turns on seven light sources 32 including the light sources 32b to 32h. That is, the display control device 63 turns on a plurality of (here, seven) successive light sources 32 centered at the light source 32e placed immediately over the center axial line X1. In the following description, a plurality of successive light sources 32 centered at the light source 32e placed immediately over the center axial line X1 are called a "center light source group".

The light sources 32 included in the center light source group change depending on a movement of the movable member 20. The display control device 63 turns off the light source 32 excluded from the center light source group and turns on the light source 32 newly included in the center light source group depending on a movement of the movable member 20. The display control device 63 may turn off the light source 32 to be turned off after executing the light-down control. The display control device 63 may turn on the newly included light source 32 with a small amount of light and then execute the light-up control. Note that the number of light sources 32 to be turned off and the number of light sources 32 to be turned on depending on a movement of the movable member 20 may be set arbitrarily. For example, the display control device 63 may turn off two light sources 32 and turn on two light sources 32 at once depending on a movement of the movable member 20.

The vehicle display device 1 according to this embodiment executes an enlarged display control for displaying an enlarged image on the inner area 10 of the decorative member 2. The enlarged image is an image of an area including a host vehicle in a navigation presentation. FIG.

10 illustrates an exemplary navigation image 40. The navigation image 40 is a virtual image displayed by the virtual image display device 6.

Figure 10:
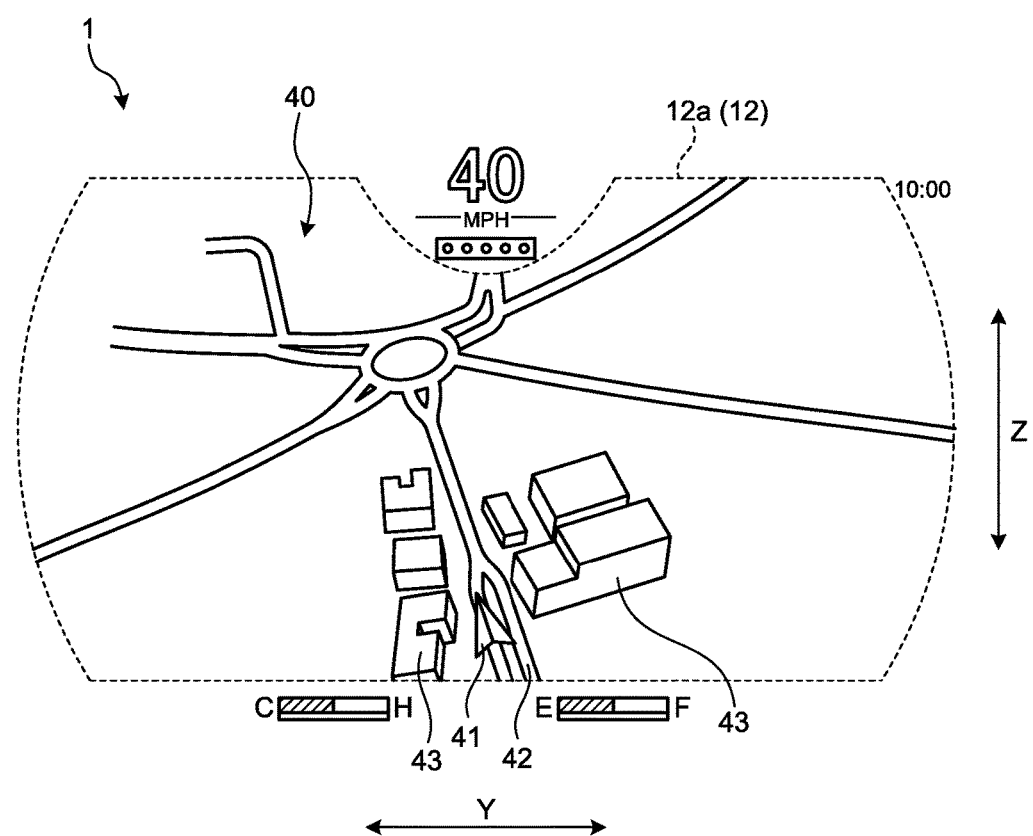
FIG. 10 is a front view illustrating an exemplary navigation image.

The navigation image 40 is displayed in a navigation area 12a which is a part of the image display area 12. The navigation area 12a contains a host vehicle image 41 which is an icon expressing the host vehicle, a road image 42, a building image 43, and the like. In FIG. 10, all the light sources 32 are turned off, so that it is difficult to substantially visually recognize the movable member 20. The navigation image 40 is displayed by overlapping with the movable member 20.

Figure 11:
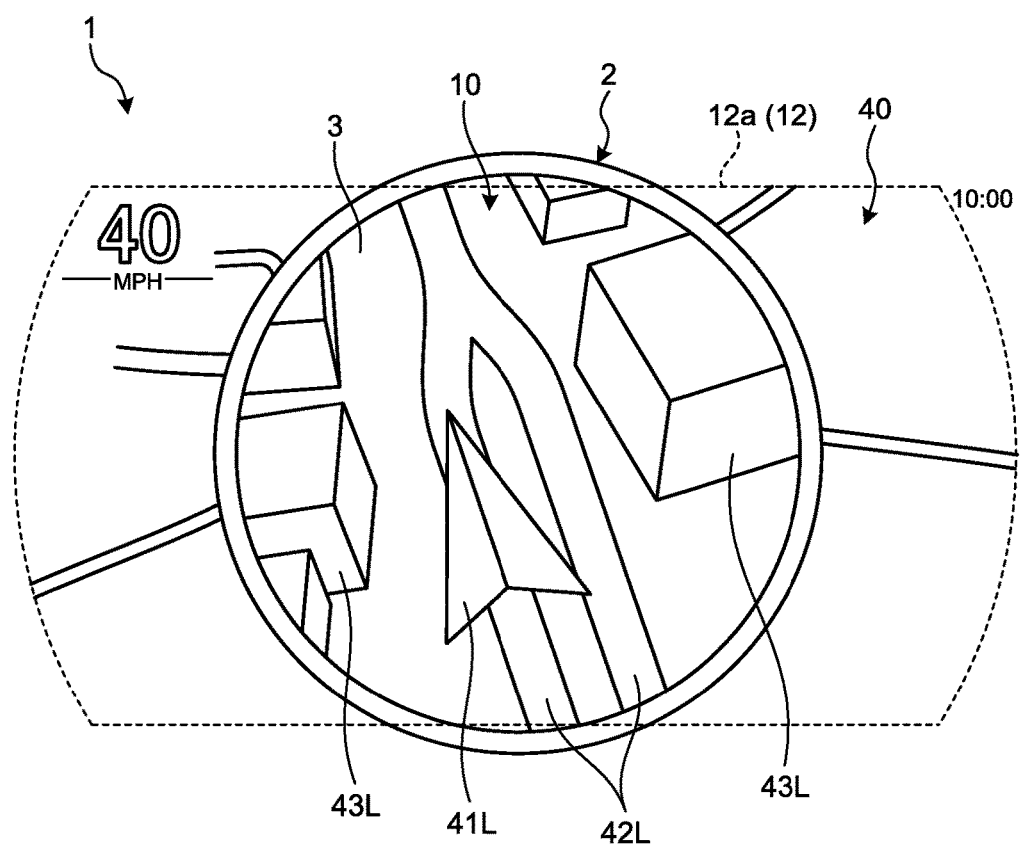
FIG. 11 is a front view illustrating a state in which an enlarged image is displayed.

As a driver inputs a manipulation for enlargedly displaying the surrounding of the host vehicle, the display control device 63 displays an enlarged image as illustrated in FIG. 11. The display control device 63 sets the decorative member 2 to a visible state by turning on the light source 32 when the enlarged image is displayed. In addition, the display control device 63 displays the enlarged image by overlapping with the information panel 3. The enlarged image includes an enlarged host vehicle image 41L, an enlarged road image 42L, and an enlarged building image 43L. A typical navigation image 40 is displayed outside of the decorative member 2. Note that the navigation image 40 is not displayed in the area overlapping with the decorative member 2.

By enlargedly displaying the host vehicle and the surrounding of the host vehicle as illustrated in FIG. 11, a driver can obtain specific information on the surrounding of the host vehicle. Note that magnification ratios of the enlarged images 41L, 42L, and 43L to a typical navigation image 40 may be set in a variable manner. For example, magnification ratios of the enlarged images 41L, 42L, and 43L to the images 41, 42, and 43 may change depending on a driver's manipulation. In addition, the position of the host vehicle image 41L in the information panel 3 may be set in a variable manner. For example, the display position of the host vehicle image 41L may change depending on a driver's manipulation. In addition, an information image may also be displayed in addition to the enlarged images 41L, 42L, and 43L. For example, a road name, a building name, a crossroad name, or the like may be displayed.

Note that the enlargedly displayed image may not be an image around the host vehicle. For example, an image regarding a road, a crossroad, a junction point, a branching point, or the like in front of the host vehicle may be enlargedly displayed.

Figure 12:
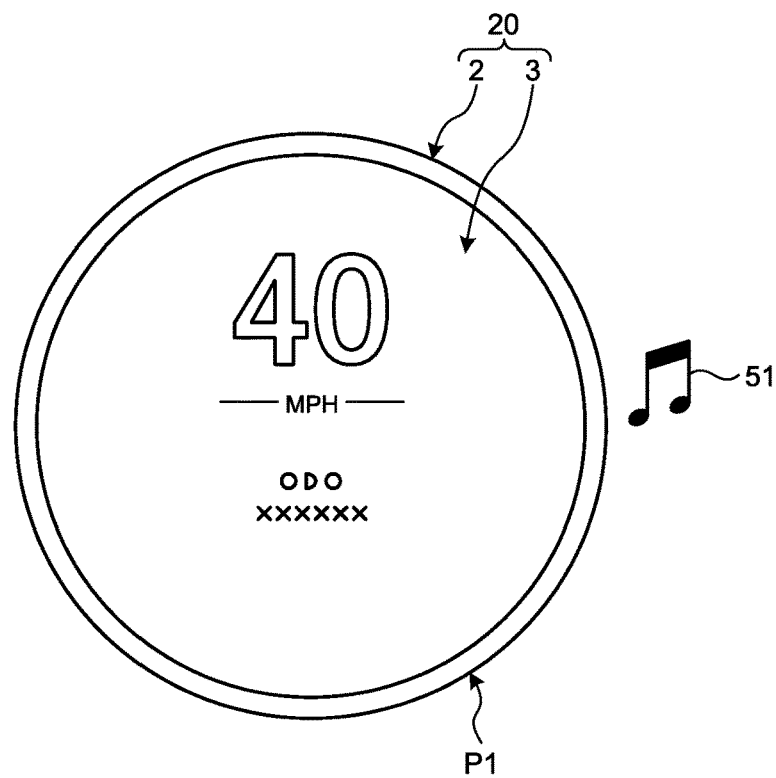
FIG. 12 is a front view illustrating a state before a warning image is displayed.

In the vehicle display device 1 according to this embodiment, a warning image is enlargedly displayed inside the decorative member 2. FIG. 12 illustrates display contents before the warning image is displayed. The movable member 20 of FIG. 12 is placed in the first position P1. The light source 32 is turned on so that the decorative member 2 can be visually recognized. A character image representing a vehicle speed or an odometer is displayed by overlapping with the information panel 3. In the right area of the decorative member 2, a multimedia image such as an image 51 of an audio device mounted to a vehicle is displayed.

Figure 13:
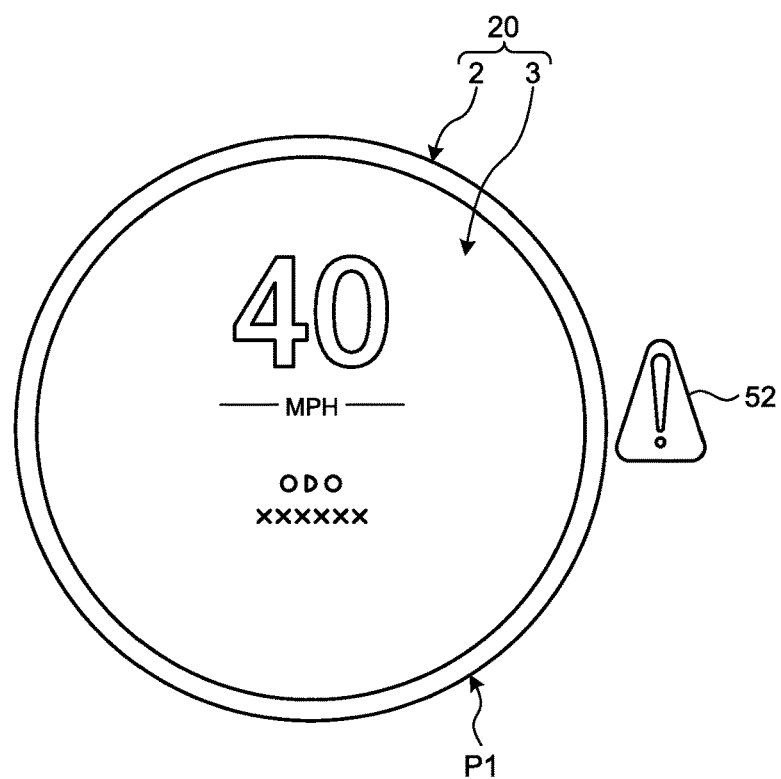
FIG. 13 is a front view illustrating a display state of the warning image.
Figure 14:
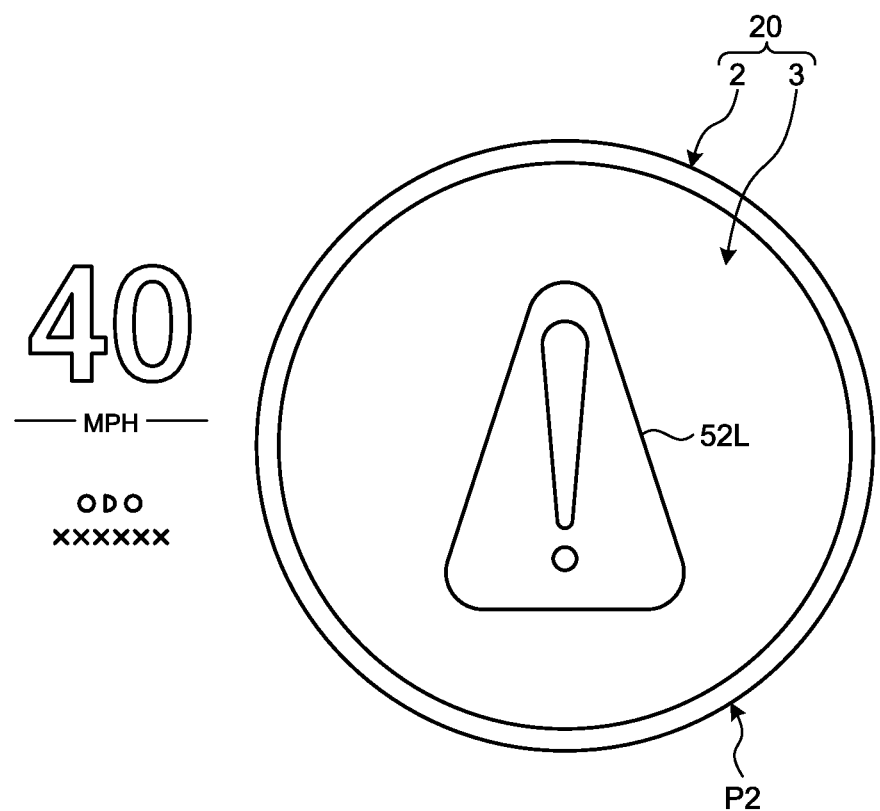
FIG. 14 is a front view illustrating an enlarged warning image.

The display control device 63 displays the warning image 52 of FIG. 13 depending on a vehicle state or the like. The warning image 52 is displayed, for example, instead of the audio device image 51. The display control device 63 moves the movable member 20 to the second position P2 while displaying the warning image 52. The second position P2 is a position where the warning image 52 and the information panel 3 overlap with each other. In other words, in the second position P2, the warning image 52 is surrounded by the decorative member 2. The display control device 63 displays the enlarged warning image 52L by overlapping with the information panel 3 as illustrated in FIG. 14 as the movable member 20 moves to the second position P2.

Since the enlarged warning image 52L is displayed, a driver can easily recognize presence of the warning image 52L. In addition, since the warning image 52L is surrounded by the decorative member 2, it is possible to attract driver's attention to the warning image 52L. Furthermore, as the decorative member 2 moves, it is possible to guide a drive's sight to the warning image 52L. Note that the display control device 63 may change the warning image 52 to the enlarged warning image 52L before the decorative member 2 reaches the second position P2. For example, the display control device 63 may sequentially enlarge and display a part of the warning image 52 overlapping with the information panel 3. That is, the display control device 63 may enlargedly display an inner image of the decorative member 2 as if there was a magnification lens inside the decorative member 2.

As described above, the vehicle display device 1 according to this embodiment displays an enlarged image on the inner area 10 of the decorative member 2. The enlarged image includes, for example, the image 41L, 42L, or 43L (FIG. 11) obtained by enlarging the image 41, 42, or 43 (FIG. 10), respectively, when the light source 32 is turned off. Since the enlarged image is displayed by switching the decorative member 2 from a non-display state to a display state, the decorative member 2 may appear as a frame of a magnification lens. In addition, the enlarged image is an image 52L (FIG. 14) obtained by enlarging the image 52 (FIG. 13) of the movement destination of the decorative member 2. Since the image of the movement destination of the decorative member 2 is enlargedly displayed, the decorative member 2 may appear as a frame of a magnification lens.

As described above, the vehicle display device 1 according to this embodiment includes the housing unit 100, the decorative member 2, the virtual image display device 6, the drive device 7, and the illumination device 30. The housing unit 100 has an opening 101 facing the eye point EP of the vehicle. The decorative member 2 is disposed inside the housing unit 100. The virtual image display device 6 is a display device for displaying an image inside the housing unit 100. The drive device 7 moves the decorative member 2 in the width direction Y of the housing unit 100.

The illumination device 30 is operated depending on a movement of the decorative member 2 to irradiate the decorative member 2 with light. In the vehicle display device 1 according to this embodiment, the operation of the illumination device 30 in response to a movement of the decorative member 2 includes turn-on and turn-off operations of the light sources 32. The display control device 63 controls the turn-on and turn-off operations of each light source 32 depending on a movement of the decorative member 2. The illumination device 30 is operated depending on a movement of the decorative member 2 to irradiate the decorative member 2 with light. Therefore, it is possible to improve a design property of the vehicle display device 1 in each position of the movement direction.

The illumination device 30 according to this embodiment has a plurality of light sources 32a to 32j arranged along the width direction Y. The illumination device 30 changes the light sources 32 to be turned on depending on a movement of the decorative member 2. That is, the illumination device 30 appropriately turns on or off a plurality of light sources 32a to 32j along a movement direction of the decorative member 2 depending on a movement of the decorative member 2. Therefore, the illumination device 30 can appropriately irradiate the decorative member 2 with light. For example, the display control device 63 causes the light sources 32 to be turned on to follow a movement of the decorative member 2.

The illumination device 30 turns on and then gradually lights up the light source 32 of the front side in the movement direction of the decorative member 2 and gradually lights down and then turns off the light source 32 of the rear side in the movement direction of the decorative member 2. By virtue of the light-up control and the light-down control, an abrupt change of the luminance of the decorative member 2 is suppressed. Therefore, the illumination device 30 can appropriately irradiate the moving decorative member 2 with light.

Alternatively, the illumination device 30 may not perform the light-up control or the light-down control. For example, the display control device 63 may turn off the light sources 32 of the first light source group 321 without performing the light-down control of the first light source group 321 when the decorative member 2 moves from the first position P1 to the second position P2. In addition, the display control device 63 may turn on the light sources 32 of the third light source group 323 with the same amount of emitted light as that of the light sources 32 of the second light source group 322 without performing the light-up control of the third light source group 323.

First Modification of Embodiment

Figure 15:
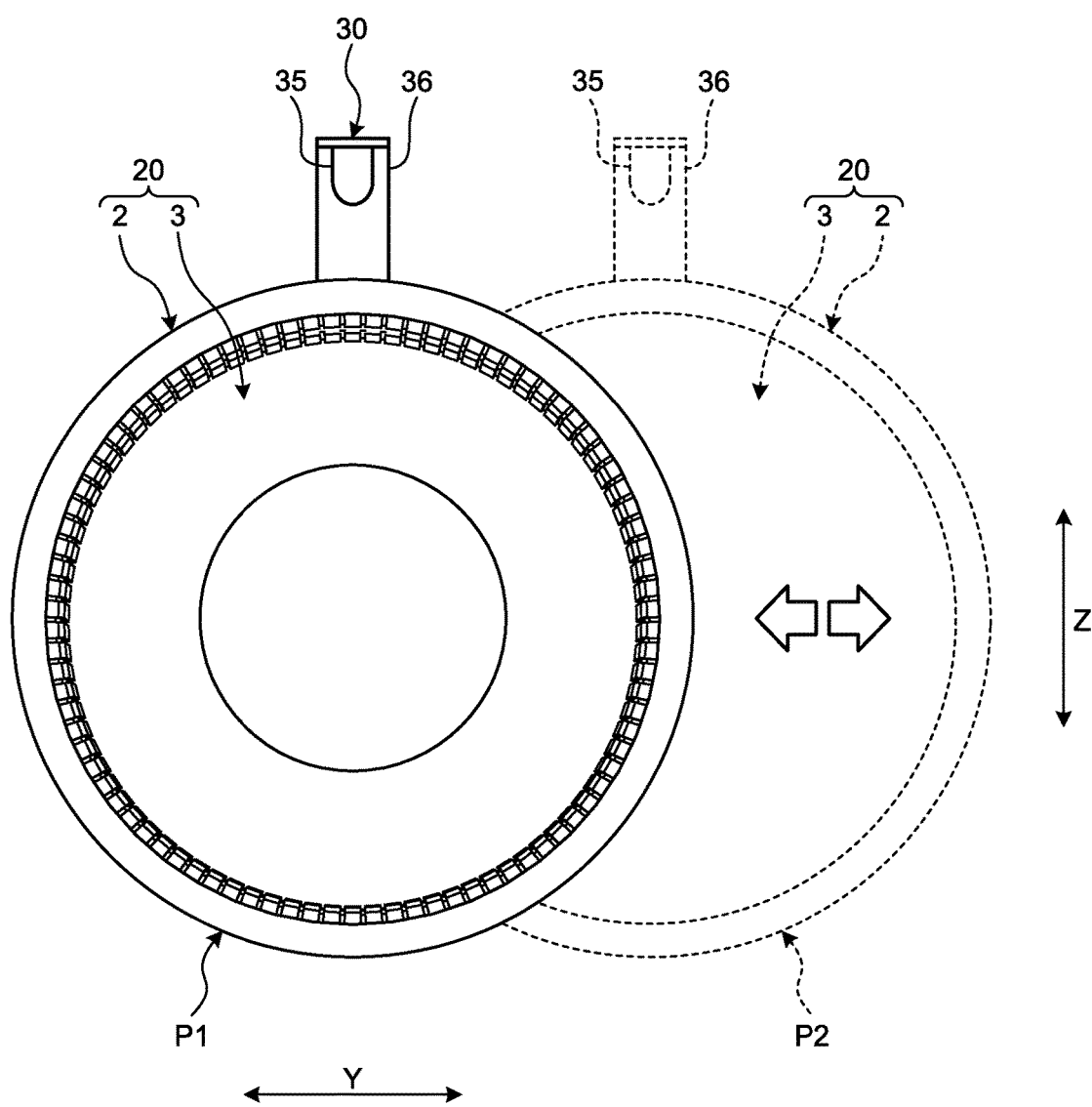
FIG. 15 is a front view illustrating a light source according to a first modification of the embodiment.

A first modification of the embodiment will now be described. FIG. 15 is a front view illustrating a light source according to a first modification of the embodiment. As illustrated in FIG. 15, the illumination device 30 of the first modification is different from the illumination device 30 of the aforementioned embodiment in that, for example, the light source 35 moves along with the movable member 20.

The illumination device 30 of the first modification has the light source 35 and a connecting member 36. The light source 35 is connected to the movable member 20 so as to move in synchronization with a movement of the movable member 20. The light source 35 is connected to the movable member 20 through the connecting member 36. The connecting member 36 is connected to, for example, the holding member 76 (FIG. 2). The light source 35 moves along with the movable member 20 while maintaining a relative position with the movable member 20. The light source 35 is controlled by the display control device 63.

Note that, in a case where the light source 35 is connected to the movable member 20 in this manner, the movable member 20 may not perform a movement of the vehicle vertical direction or an operation of changing the tilt angle θ. In other words, the vehicle display device 1 may have a second drive device 8 and may not have the drive device 7. As illustrated in FIG. 15, the illumination device 30 of the first modification is suitable for the movable member 20 that moves along the width direction Y. The light source 35 can irradiate the movable member 20 with light in the same relative position for the first and second positions P1 and P2.

As described above, the illumination device 30 of the first modification moves along with the decorative member 2 in the width direction Y. Therefore, the illumination device 30 of the first modification can appropriately irradiate the decorative member 2 with light.

Second Modification of Embodiment

Figure 16:
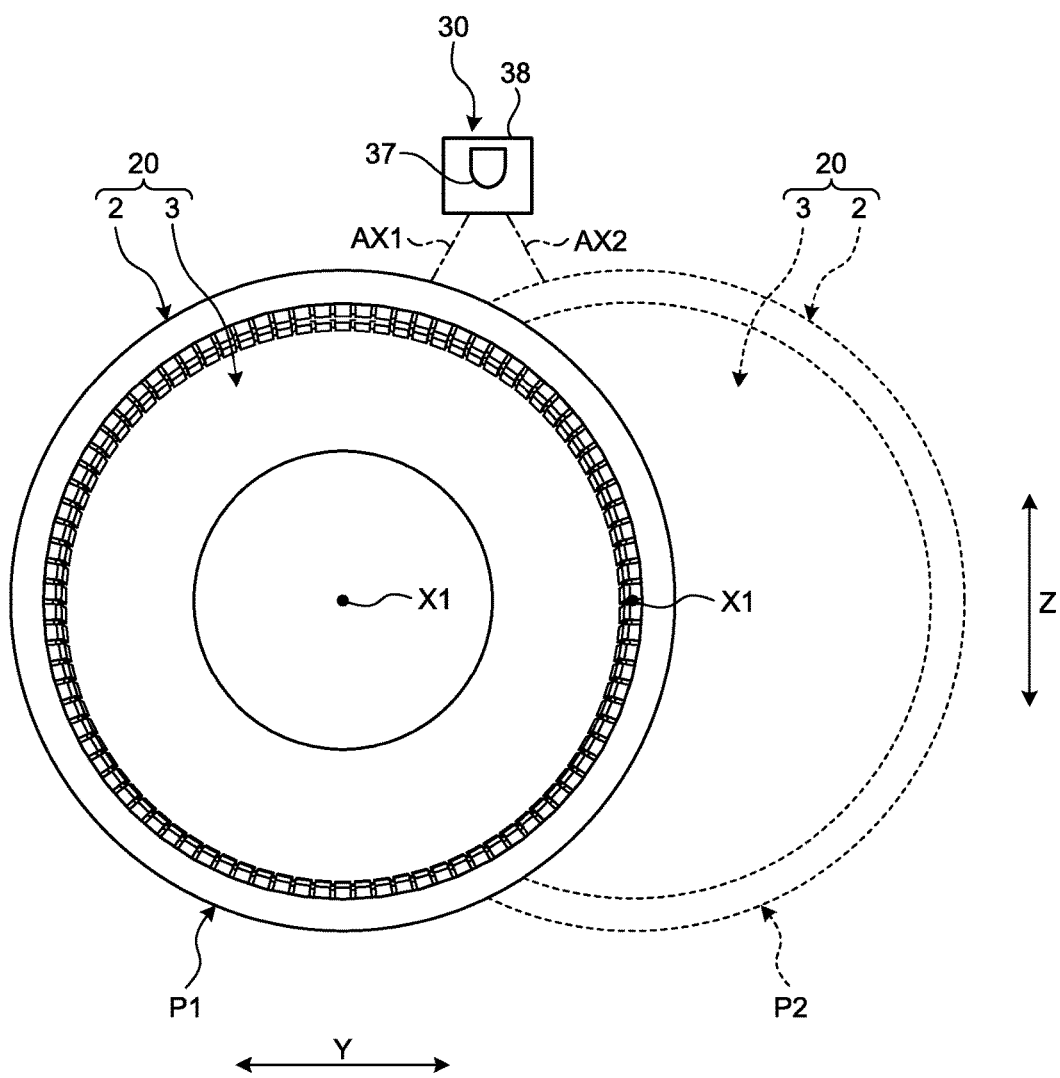
FIG. 16 is a front view illustrating a light source according to a second modification of the embodiment.

A second modification of the invention will now be described. FIG. 16 is a front view illustrating a light source according to a second modification of the embodiment. The illumination device 30 according to the second modification is different from the illumination device 30 of the aforementioned embodiment in that, for example, the optical axis AX of the light emitted from the light source 37 is changeable between a first optical axis AX1 and a second optical axis AX2.

The illumination device 30 has a light source 37 and a changeable mechanism 38. The changeable mechanism 38 is a unit configured to change the optical axis AX of the emitted light. The changeable mechanism 38 may be a driving mechanism such as a motor capable of changing a posture of the light source 37. Alternatively, the changeable mechanism 38 may be an optical mechanism capable of changing an optical path of the light emitted from the light source 37.

If the movable member 20 is placed in the first position P1, the optical axis AX of the light source 37 is set to the first optical axis AX1. A direction of the first optical axis AX1 is a direction for irradiating the movable member 20 of the first position P1 with light. For example, as seen in a front view, the first optical axis AX1 intersects with the center axial line X1 of the first position P1.

If the movable member 20 is placed in the second position P2, the direction of the optical axis AX of the light source 37 is set to the second optical axis AX2. The direction of the second optical axis AX2 is a direction for irradiating the movable member 20 of the second position P2 with light. For example, as seen in a front view, the second optical axis AX2 intersects with the center axial line X1 of the second position P2.

As described above, the illumination device 30 according to the second modification has the changeable mechanism 38 as a unit that changes the direction of the optical axis AX of the emitted light. The illumination device 30 changes directions of the optical axes AX1 and AX2 depending on a movement of the decorative member 2. Therefore, the illumination device 30 can appropriately irradiate the decorative member 2 with light. Note that the changeable mechanism 38 may gradually change a direction of the optical axis AX as well as switch the optical axis AX between the first optical axis AX1 and the second optical axis AX2. Specifically, the direction of the optical axis AX may gradually change from the first optical axis AX1 to the second optical axis AX2 or from the second optical axis AX2 to the first optical axis AX1 to follow a movement of the decorative member 2.

Third Modification of Embodiment

The shape of the decorative member 2 is not limited to the aforementioned ones. The ring-shaped decorative member 2 also includes a partially opened shape as well as a closed shape. The partially opened ring shape of the decorative member 2 described above may include, for example, a C-shape.

The shape of the decorative member 2 is not limited to the ring shape. For example, the decorative member 2 may include a spherical member or a semispherical member. In addition, the decorative member 2 may also be a light-transmitting member. For example, the decorative member 2 may be a spherical or semispherical transparent member.

The decorative member 2 may be a split type. For example, the decorative member 2 may be split into a pair of semi-ring parts. For example, a pair of semi-ring parts may be divided from or combined into a ring shape by moving oppositely in the width direction Y. In this case, the illumination device 30 irradiates each of the two parts with light when the decorative member 2 is split. When the two parts are combined, similarly to the aforementioned embodiment, the illumination device 30 irradiates the decorative member 2 with light.

Fourth Modification of Embodiment

A fourth modification of the embodiment will now be described. The image displayed on the image display area 12 is not limited to the virtual image. For example, a display device such as a liquid crystal display device may be disposed in rear of the decorative member 2. In this case, the movement direction of the decorative member 2 is preferably set to the width direction Y. That is, the decorative member 2 moves in the width direction Y, but may not move in the height direction Z or perform a tilt/upright operation. In addition, in a case where the display device is disposed in rear of the decorative member 2, the information panel 3 is omitted. That is, the movable member 20 is configured to allow a driver to visually recognize an image displayed on the display device through the inner area 10.

The contents described in the aforementioned embodiments and modifications may be suitably combined and executed.

According to an aspect of the embodiment, there is provided a vehicle display device including: a housing unit having an opening facing an eye point side of a vehicle; a decorative member disposed inside the housing unit; a display device configured to display an image inside the housing unit; a drive device configured to move the decorative member in a width direction of the housing unit; and an illumination device operated depending on a movement of the decorative member to irradiate the decorative member with light. Using the vehicle display device according to the embodiment, it is possible to appropriately irradiate the movable decorative member with light from the illumination device. Therefore, the vehicle display device according to the embodiment exhibits the effect capable of improving a design property.

Although the embodiment has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
    a housing unit that has an opening facing an eye point side of a vehicle;
    a decorative member disposed inside the housing unit;
    a display device that displays an image inside the housing unit;
    a drive device that moves the decorative member in a width direction of the housing unit; and
    an illumination device operated depending on a movement of the decorative member, and disposed in an upper side with respect to the decorative member in a height direction in an internal space of the housing unit to irradiate a surface of the decorative member facing the eye point side with light.

2. The vehicle display device according to claim 1, wherein
    the illumination device has a plurality of light sources that is arranged along the width direction, and
    the illumination device changes the light source to be turned on depending on a movement of the decorative member.

3. The vehicle display device according to claim 2, wherein
    the illumination device turns on and then gradually lights up the light source of a front side in a movement direction of the decorative member, and gradually lights down and then turns off the light source of a rear side in the movement direction of the decorative member.

4. The vehicle display device according to claim 1, wherein
    the illumination device moves in the width direction along with the decorative member.

5. The vehicle display device according to claim 1, wherein
    the illumination device has a unit that changes an optical axis direction of emitted light to change the optical axis direction depending on a movement of the decorative member.

6. The vehicle display device according to claim 1, wherein
    the illumination device operates depending on a relative movement of the decorative member with respect to the illumination device.

* * * * *